(No Model.)

J. A. MITCHENER.
FERTILIZER DISTRIBUTING ATTACHMENT FOR CARTS.

No. 309,641. Patented Dec. 23, 1884.

WITNESSES:
Chas. Nida
C. Sedgwick

INVENTOR:
J. A. Mitchener
BY Munn & Co.
ATTORNEYS.

UNITED STATES PATENT OFFICE.

JOHN A. MITCHENER, OF SELMA, NORTH CAROLINA.

FERTILIZER-DISTRIBUTING ATTACHMENT FOR CARTS.

SPECIFICATION forming part of Letters Patent No. 309,641, dated December 23, 1884.

Application filed February 28, 1884. (No model.)

*To all whom it may concern:*

Be it known that I, JOHN A. MITCHENER, of Selma, in the county of Johnston and State of North Carolina, have invented a new and useful Improvement in Fertilizer-Distributing Attachments for Carts, of which the following is a full, clear, and exact description.

Reference is to be had to the accompanying drawings, forming part of this specification, in which similar letters of reference indicate corresponding parts in all the figures.

Figure 1:
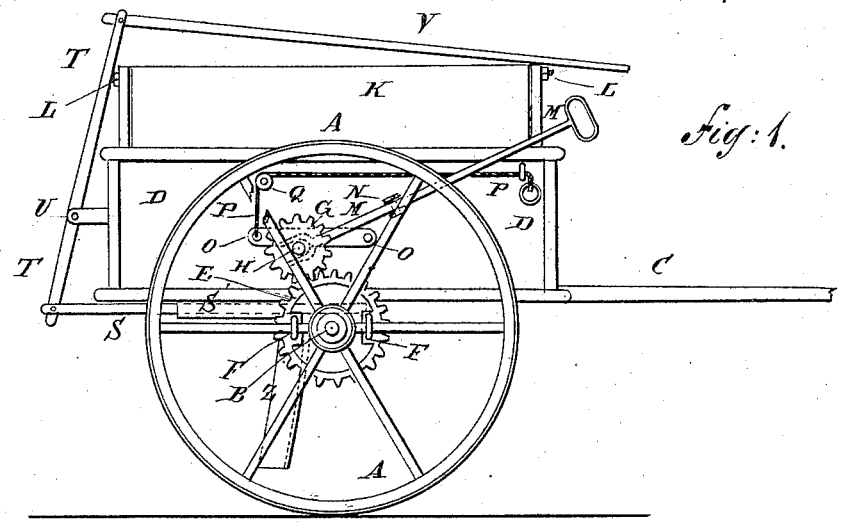
Figure 2:
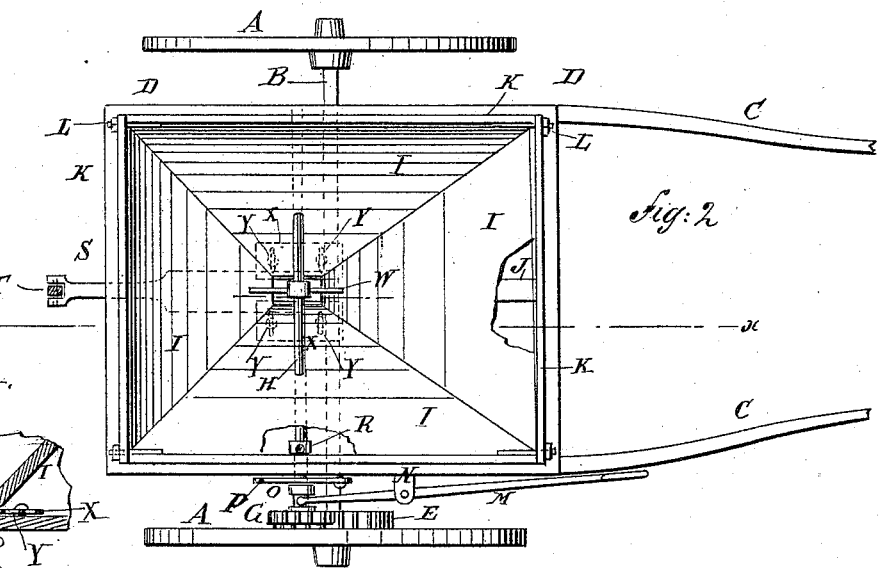
Figure 4:
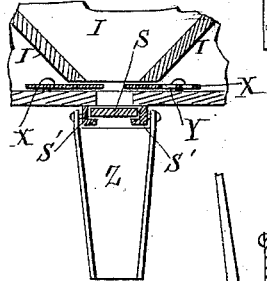
Figure 3:
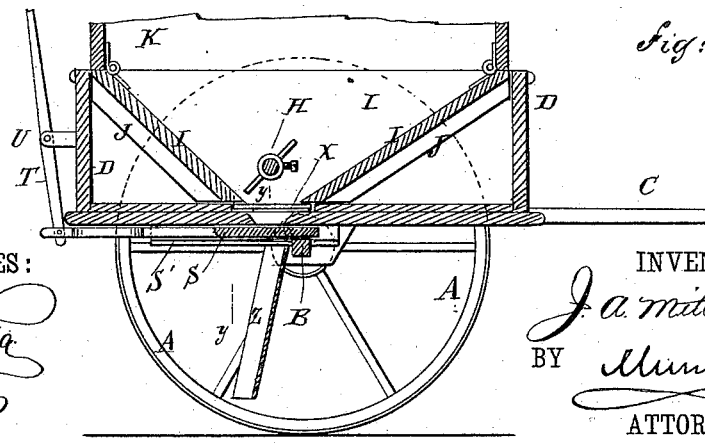

Figure 1 is a side elevation of my improvement shown as applied to a cart. Fig. 2 is a plan view of the same, parts being broken away. Fig. 3 is a sectional side elevation of the same, taken through the line $x\ x$, Fig. 2. Fig. 4 is a sectional rear elevation of a part of the same, taken through the line $y\ y$, Fig. 3.

The object of this invention is to provide attachments for carts, by the use of which fertilizers will be distributed automatically as the carts are drawn across the fields.

The invention consists of the combination of parts and their construction, substantially as hereinafter fully set forth, and pointed out in the claim.

A represents the wheels, B the axle, C the shafts, and D the body or box, of an ordinary cart.

Upon the inner end of the hub of a wheel, A, is placed a gear-wheel, E, which is secured in place by U-shaped bolts F, passing around the spokes of the wheel A and through the gear-wheel E, or by other suitable means. The teeth of the gear-wheel E mesh into the teeth of a smaller gear-wheel, G, attached to the end of a shaft, H, which works and slides in bearings in the sides of the cart-body D and in the sides of a hopper, I, placed within the said body D, and secured detachably to it by bolts or rods and nuts, or by other suitable means. The sides and triangular ends of the hopper I are strengthened by cleats or braces J, attached to the said sides and ends. The hopper I is provided with an upward extension, K, hinged to its upper edge, so that it can be folded down, and which is held in place when raised by bolts and nuts L, or other suitable means.

In a groove in the shaft H, at the inner side of the gear-wheel G, rides the forked end of a lever, M, which is pivoted to a support, N, attached to the side of the cart-body D. The forward end of the lever M extends to the forward end of the body D, so that it can be readily reached and operated by the driver to throw the gear-wheel G into and out of gear with the gear-wheel E. The gear-wheel G is locked in place when in gear by the latch O, pivoted at one end to the side of the body D, and which enters an annular groove in the shaft H.

To the free end of the latch O is attached the end of a cord, P, which passes over a guide-pulley, Q, pivoted to the side of the body D. The free end of the cord P extends to the forward end of the cart-body D, so that it can be readily operated by the driver. The gear-wheel G is kept from being moved outward beyond the gear-wheel E by a collar, R, secured by a set-screw to the shaft H at the inner side of the side-board of the body D. The hopper I is so formed as to leave a long narrow discharge-opening between the lower edges of its sides and ends, and in the bottom of the cart-body is formed a corresponding discharge-opening. The discharge-opening is closed when turning around and when passing from place to place by a board, S, placed in grooved cleats S', or other supports attached to the bottom of the body D.

To the rear end of the slide S, or to a rod attached to the said end, is hinged the lower end of a lever, T, which is pivoted to a support, U, attached to the rear end of the cart-body. The upper end of the lever T projects above the top of the hopper-extension K, and to it is hinged the rear end of the rod V, the forward end of which extends to the forward end of the cart-body, so that it can be readily reached and operated by the driver to move the slide S and open and close the discharge-opening in the bottom of the said cart-body.

To the shaft H is attached a cross-pin, W, in such a position as to be directly over the discharge-opening when the gear-wheels G E are in gear, so as to keep the fertilizer in the lower part of the hopper I stirred up and cause it to pass out readily. The amount of fertilizer distributed is regulated by plates X, placed below the lower parts of the sides of the hopper I, and secured in place by bolts Y. The plates X are slotted transversely to receive the bolts Y, so that they can be adjusted by loosening the said bolts. When the hopper and its attachments are removed and the machine used as a cart, the plates X are adjusted to bring their inner edges together and close the opening in the cart-body bottom.

Beneath the discharge-opening in the bottom of the cart-body D is placed a spout, Z, to receive the fertilizer and conduct it to the ground, so as to prevent the said fertilizer from being scattered by the wind. The spout Z is hinged at its upper end to the side cleats, S', at the rear side of the axle B, so that the lower end of the said spout can swing back to prevent the spout from being broken should it strike a stump, stone, or other obstruction.

Having thus fully described my invention, I claim as new and desire to secure by Letters Patent—

In a fertilizer-distributing attachment for carts, the cart or vehicle body A, having the hopper I arranged therein, and the extensions K, disposed at the upper end of said hopper to fold down thereon, substantially as shown and described, and for the purpose set forth.

JNO. A. MITCHENER.

Witnesses:
HENRY LOUIS SMITH,
J. W. VICK.